1

2,941,017

NAPTHALENE EXTRACTION PROCESS UTILIZING POLYNITRO AROMATIC COMPOUNDS AS COMPLEXORS

Franklin Veatch and Robert W. Foreman, Lyndhurst, and Jeanette A. Gecsy, Cleveland, Ohio, assignors to The Standard Oil Company, Cleveland, Ohio, a corporation of Ohio No Drawing. Filed Mar. 3, 1955, Ser. No. 492,036
Claims priority, application Belgium Mar. 6, 1954

7 Claims. (Cl. 260—674)

This invention relates to a process of separating fused polycyclic aromatic compounds from hydrocarbon mixtures containing the same.

Naphthalene is illustrative of these fused polycyclic aromatic compounds and it serves, among other purposes, as a raw material for the manufacture of phthalic anhydride which is finding increasing use in "alkyd" resin manufacture. Heretofore, the primary source of naphthalene has been coal tar, but the supply from this source is not meeting the needs of the resin and other industries.

It is known that numerous streams in a petroleum refinery contain a substantial amount of naphthalene and its homologues. However, the separation of naphthalene from the other hydrocarbons in these streams has not been practical by the usual separation techniques. Distillation, for example, cannot be used because the boiling point of naphthalene (218° C.) is too close to the boiling point of other hydrocarbons. Solvent extraction does not separate naphthalene from other aromatic compounds, such as alkylated monocyclics.

This invention, more particularly, relates to a cyclic liquid contacting process for separating naphthalene from hydrocarbon stocks containing the same. In accordance with the process of the invention, the hydrocarbon stock is contacted with a solution of an agent, hereinafter called a "complexor," which forms a complex or adduct with the naphthalenes. This complex remains in the liquid complexor phase in either dissolved form or in the form of a slurry. The liquid hydrocarbon phase is then separated from the liquid complexor phase, and the hydrocarbon phase from which the naphthalenes have been removed or extracted is used for the purposes to which it is usually applied. The liquid complexor phase is then treated to remove the naphthalenes therefrom and the complexor phase is recycled, after adjustment of its concentration or composition, if necessary, for use for treating an additional amount of hydrocarbon stock. It will be seen that the process does not use up any raw materials since the complexor is recycled without the need of regeneration or chemical modification. The process does not involve a liquid-solid treatment or a solid-from-liquid separation both of which have disadvantages. Our process possesses all of the advantages of a liquid-liquid contact and separation system.

The invention will be better understood from a consideration of the following discussions of the various aspects therof:

*The hydrocarbon stock to be treated and the compounds to be separated.*—The hydrocarbon stocks that can be treated in accordance with the invention may be any that contain an appreciable amount of fused polycyclic aromatic compounds. Examples are the naphthalenes, which as used herein, include naphthalene ($C_{10}H_8$) and its homologues and its substituted compounds such as methyl naphthalene, naphthols, etc., phenanthrene and anthracene and their substituted compounds, such as ethylphenanthrene and anthraquinone. The hydrocarbons with which the fused polycyclics are found mixed in the stock may boil in the same range or below or above the fused polycyclics, and may, for example, be aliphatic hydrocarbons, heterocyclics, naphthenes and monocyclic aromatic compounds. These compounds are not separated by the process to any appreciable extent. Any stock may be used as long as it is liquid under the treating conditions. The amount of the fused polycyclic aromatic compounds in the stock to be treated may vary from a fraction of 1% to a major portion. The larger the amount, the greater is the efficiency of the process. Usually the stock has from 0.05% to 50%, preferably 1% to 15% of the fused polycyclic aromatic compounds. Examples of stocks and the amount of fused polycyclics therein are as follows:

| | Percent |
|---|---|
| Catalytic distillate | 0.5 to 5.0 |
| Thermal reformate | 2.0 to 8.0 |
| Decoker gas oil | 0.1 to 5.0 |
| Coker gas oil | 0.1 to 5.0 | or suitable fractions of these wherein the desired polycyclics have been concentrated by distillation.

*The complexor.*—A number of compounds are useful as complexors and the materials which form complexes with fused polycyclic aromatic compounds are known or can be ascertained from the literature. These compounds are selective complexors for naphthalene even in the presence of large amounts of toluene. Most, if not all, of these materials have a high boiling point which is above the boiling point of the fused polycyclic aromatic compounds and the complexes formed therewith. This permits decomposition of the complexes and the recovery of the compound without adversely affecting the complexor. These complexes fall into several types. One is the anhydride type such as phthalic anhydride, tetrachlorophthalic anhydride and mellitic anhydride. Another is the quinone type, such as chloranil and quinone. Still another type includes the polynitro aromatic compounds, especially monocyclic, such as picric acid, trinitrofluorenone, picramic acid, dinitrochlorobenzene, dinitrophenol, dinitrosalicyclic acid, trinitrotoluene, etc. The latter type is preferred and picric acid, and 3,5-dinitrosalicyclic acid have been studied the most extensively and are believed to be the most suitable.

*The complexor solvent.*—The solvent that is employed should have the following characteristics: it should be liquid under the conditions of treatment, and should be a solvent for the complexor to such an extent that it dissolves an adequate amount. However, it must not react chemically with the complexor or otherwise adversely affect it. The solvent preferably should have a boiling point sufficiently different from the fused polycyclic compound, either above or below (or if it is a mixture, the constituents may boil both above and below), so as to permit separation of the fused polycyclic aromatic compound from the solvent by distillation. It should be substantially insoluble in the hydrocarbon stocks to be treated and the hydrocarbon stocks should have a minimum solubility in the solvent. Examples of solvents are water, glycols, especially ethylene glycols, and mixtures thereof. The presence of water in the solvent minimizes the solubility of the hydrocarbons in the solvent. The above listed solvents are especially useful with the polynitro compounds. Diethylene glycol (DEG) and triethylene glycol (TEG) are examples of glycols that are especially suitable. The latter is preferred because of its higher boiling point which permits the fused polycyclic aromatic compounds to be separated from the solvent more readily. In addition, triethylene glycol, especially aqueous mixtures thereof, is an excellent solvent for picric acid and analogous polynitro aromatic compounds.

The concentration of the complexor in the solution may be varied. The maximum concentration is determined by the solubility of the particular complexor selected in the particular solvent. Generally as high a concentration will be used as practical so long as the complex formed is soluble in the solvent or readily slurried in it. Small amounts require the use of more solution for a given amount of separation, with a consequent lowering in efficiency. The lower limit will be determined by economic considerations. Generally it will not be less than 25% of the maximum solubility.

*The treating conditions and techniques.*—The solution of the complexor and hydrocarbon stock to be treated are mixed by any technique, such as by stirring, shaking, passing a gas through it, or other types of agitation. The time of mixing should be sufficient to assure formation of substantially all of the complex that will form under the treating conditions in a reasonable time. The complex formation is not a slow reaction and prolonged mixing times are not required. The length of the mixing time is also a function of the thoroughness of mixing, i.e., the more thorough the mixing, the shorter will be the time required. Generally the mixing time will be from 10 seconds to 10 minutes. Longer times are not harmful but are not economical. Generally one to ten minutes is adequate.

The proportion of the complexor solution and the hydrocarbon stock are such as to provide sufficient complexor to form a complex with the amount of the fused polycyclic aromatic compound to be separated. This will depend on the concentration of the complexor in the solution and in part on the molal ratio of the complexor and the fused polycyclic aromatic compound in the complex. For example, if one mol of the aromatic compound is to be separated from the hydrocarbon stock and the complex forms with one to one mol ratio with the complexor, then sufficient complexor solution should be used, taking into account the concentration of the complexor in the solution, to provide at least one mol of complexor. Generally, an excess of complexor above the theoretical is preferred such as a 2 to 1, up to a 10 to 1 ratio to facilitate the formation of a complex with as much of the fused polycyclic aromatic compound to be separated as is possible.

The process is generally carried out at atmospheric pressure but super-atmospheric pressure may be used if necessary to keep all of the materials in the liquid phase and to minimize loss due to evaporation.

The temperature should be sufficiently low to favor the formation of the complex. Generally the lower the temperature, the more efficient is the extraction by complex formation. The temperature must be above the freezing point of any of the liquid components. Excessively low temperatures which would not add to the recovery are unnecessary and uneconomic. In addition, low temperatures result in decreased solubility of the complexor in the solution. As illustrative, in one system, a temperature of 75° C. gave a 30% recovery; 35° C. gave a 66% recovery; and 5° C. gave a 100% recovery. There is no point in using a temperature below 5° C. in this system. In general, the increased efficiency in recovery due to lower temperatures will justify their use.

In many systems, the complex is soluble in the complexor solution. In other systems, if the solubility of the complex in the complexor solution is exceeded, the excess complex will be present in the solution to form a slurry. The reference to a liquid phase includes a true solution and a solution or solvent containing a solid as a slurry but which can be treated by liquid separation techniques. It is an important advantage of our process that the complexor phase and the complex can be separated as a liquid phase.

*The separation.*—After extraction is complete, the agitation is stopped and two immiscible phases form that may be separated by decantation or centrifugal force. Preferably, the separation is carried out at about the same temperature and under the same conditions as are employed in the treating technique.

The hydrocarbon phase, after separation, may be employed for any of the usual purposes for which it was originally intended. Generally the amount of solvent or complexor in it is so small as not to require any special treatment of the hydrocarbon phase. If desired, it may be water-washed or treated with caustic or other chemicals and then washed before use.

*The recovery of the fused polycyclic aromatic compounds.*—The complexor solution phase which contains the complex is then treated to decompose the complex and liberate the fused polycyclic aromatic compound for recovery. Inasmuch as the complex decomposes at a temperature below the boiling point of the fused polycyclic aromatic compounds, these compounds can readily be separated. If the solvent is low boiling such as methanol, it may be distilled off first. If the solvent is high boiling such as triethylene glycol (B.P. 290° C.) it will remain behind after the fused polycyclic aromatic compound has distilled out. In all cases the complexor is high boiling and does not distill out. Steam distillation is a simple method of distilling off the fused polycyclic aromatic compounds. The complex can also be decomposed by other means such as drowning in a solvent which decomposes complex.

*Recycling and reconditioning of the complexor solution.*—The liquid complexor phase which remains after separation of the aromatic compounds from the complex can be reused and is therefore recycled for use in treating an additional amount of hydrocarbon stock. If any adjustment in its composition is required, such as the return of solvent which may have been removed during the complex decomposition, this adjustment may be made, and any makeup components added, before the complexor solution is recycled.

The invention will be better understood in connection with the following examples which are illustrative.

EXAMPLE I

A hydrocarbon stock containing primarily aliphatic, naphthenic and monocyclic aromatic hydrocarbons boiling in the range of 100° to 200° C. and containing 4% of naphthalene ($C_{10}H_8$) by weight was contacted by stirring for 3 minutes at a temperature of 35° C. with a solution formed by a solvent containing 80% triethylene glycol and 20% water and having dissloved therein 45% of 3,5-dinitrosalicyclic acid as a complexor. The proportion of the hydrocarbon stock and complexor solutions was sufficient to provide a ratio 6.4 mols of complexor per mol of naphthalene in the hydrocarbon stock. At the conclusion of the mixing, the two phases were permitted to stratify and were separated. The hydrocarbon phase was water washed to remove any complexor therein. The complexor solution containing the complex was steam distilled and the naphthalene thus recovered represented 40% of the naphthalene originally in the hydrocarbon stock. After adjustment of the amount of water, the complexor solution was recycled for treatment of an additional amount of the hydrocarbon stock under the above described treating conditions.

EXAMPLE II

A similar hydrocarbon stock was similarly treated except that the complexor solvent was methanol containing 10% water in which was dissolved 12% picric acid. The complex phase was separated by diluting the water and washing with pentane which removed the naphthalene from the complex. The pentane was stripped, leaving a naphthalene residue which amounted to 94% of the naphthalene in the original hydrocarbon stock. The methanol and picric acid were separated, reconstituted, and the complexor solution recycled.

As illustrative of the effect of temperature on the extraction, a whole catalytic distillate containing 1.03% naphthalene was treated with a complexor solution containing 250 grams per liter of picric acid in a solution of 10% aqueous triethylene glycol. The extraction was carried out by mixing the complexor phase and the catalytic distillate at several temperatures by stirring the mixtures for one minute in a Morton flask immersed in a constant temperature bath. The ratio of the complexor phase to catalytic distillate was 1 to 1 volumes. The naphthalene was recovered from the complex by steam distillation. The results are shown in the following table in which "Efficiency" is determined by comparing the concentration of the napthalene in the raffinate with that in the feed stock. "Selectivity" is a measure of the purity of the product and is the percent of total naphthalenes in the hydrocarbon recovered from the complexor phase. The results were as follows:

| Temperature | Percent Efficiency | Percent Selectivity |
|---|---|---|
| 36° F | 30.0 | 17.94 |
| 75° F | 25.0 | 15.5 |
| 150° F | 13.6 | 14.34 |

The above experiment was repeated at 75° F. except that the amount of water in the aqueous triethylene glycol was increased to 20% and the results were as follows:

| Percent H₂O in TEG | Percent Efficiency | Percent Selectivity |
|---|---|---|
| 10 | 25.0 | 15.5 |
| 20 | 16.7 | 20.56 |

The above experiments were repeated except that the mixing time was increased to 10 minutes and the results were as follows:

| Temperature | Mixing Time, min. | Percent Efficiency | Percent Selectivity |
|---|---|---|---|
| 36° F | 1 | 30.0 | 17.94 |
| 36° F | 10 | 32.0 | 21.10 |
| 75° F | 1 | 25.0 | 15.5 |
| 75° F | 10 | 28.0 | 12.8 |
| 150° F | 1 | 13.6 | 14.34 |
| 150° F | 10 | 16.5 | 12.98 |

The experiments were repeated using diethylene glycol instead of triethylene glycol with the following results:

| Concentration of Picric Acid in grams/liter | Solvent | Percent Efficiency | Percent Selectivity |
|---|---|---|---|
| 225 | 20% Aq. TEG | 16.7 | 20.56 |
| 113 | 20% Aq. DEG | 8.8 | 24.33 |

This shows the effect of the greater solubility of picric acid in triethylene glycol.

Whole catalytic distillate gave a relatively low selectivity due to the very low concentration of naphthalenes in it. The above experiments were repeated using a fraction of the catalytic distillate boiling from 400–430° F. and containing 8.64% naphthalenes, and using 3,5-dinitrosalicylic acid as the complexor. The mixing time was 10 minutes. The results were as follows:

| Complexor | Concentration in grams/liter | Solvent | Temperature, °F. | Percent Efficiency | Percent Selectivity |
|---|---|---|---|---|---|
| PA | 250 | 10% Aq. TEG | 75 | 53.2 | 33.86 |
| PA | 100 | 20% Aq. TEG | 75 | 29.4 | 42.04 |
| DNSA | 225 | 20% Aq. TEG | 0 | 25.4 | 23.11 |
| DNSA | 300 | 20% Aq. TEG | 75 | 27.0 | 42.94 |
| DNSA | 600 | 50% Aq. TEG | 125 | 23.4 | 44.94 |

The Selectivity increased with the higher temperature and the Efficiency did not drop off due to the increased solubility of the complexor.

In further experiments another catalytic distillate concentrate having 6.31% naphthalenes was used in the following experiments in which the temperature was 65° F. and the other variables were the same as in the previous experiments except as indicated, and in which acetone, methyl alcohol and acetic acid were used as solvents along with diethylene glycol. In these experiments the complex was decomposed by drowning in hot water instead of steam distillation. The results are as follows:

| Concentration of DNSA in grams/liter | Solvent | Mixing Time (Minutes) | Percent Efficiency | Percent Selectivity |
|---|---|---|---|---|
| 600 | 10% Aq. DEG | 28 | 37.8 | 20.33 |
| 300 | 5% Aq. HOAc | 10 | 37.6 | 9.57 |
| 500 | 25% Aq. Acetone | 10 | 43.5 | 22.28 |
| 300 | 25% Aq. MeOH | 10 | 31.0 | 22.09 |
| 160 | 30% Aq. HOAc | 10 | 11.7 | 23.23 |
| 300 | 20% Aq. TEG | 10 | 23.8 | 25.43 |

The above tables and experiments show the variables and their effect and the manner in which the invention may be practiced within the following claims.

We claim:
1. A process for separating fused polycyclic aromatic compounds from hydrocarbon stocks containing the same which comprises contacting the hydrocarbon stock in a liquid phase with an amount of a liquid phase solution of a polynitro aromatic compound, which is a complexor for said aromatic compounds, in a solvent consisting essentially of a glycol and water, which is substantially insoluble in said hydrocarbon stock, to dissolve the complex formed between the polynitro aromatic complexor and the fused polycyclic aromatic compounds so that the complex remains dissolved in the liquid complexor solution phase, said amount of liquid phase complexor solution being sufficient to form the complex and greater than the amount to form a solid complex, and the amount of complexor in said solution being at least the theoretical amount to form a complex with said fused polycyclic aromatic compounds, separating the liquid hydrocarbon phase from the liquid complexor solution phase containing the complex in solution, decomposing the complex while contained within the liquid complexor solution phase to recover said aromatic compound directly therefrom, and recycling the liquid complexor solution phase to treat an additional amount of stock.

2. The process of claim 1 in which the fused polycyclic aromatic compound is a naphthalene.

3. The process of claim 1 in which the compound is picric acid.

4. The process of claim 1 in which the compound is dinitrosalicylic acid.

5. The process of claim 1 in which the glycol is triethylene glycol.

6. The process of claim 1 in which the hydrocarbon stock and the complexor solution are contacted by agitation followed by stratification before separation.

7. The process of claim 1 in which the aromatic compound is separated from the complex by steam distillation.

References Cited in the file of this patent

UNITED STATES PATENTS

| | | |
|---|---|---|
| 1,678,591 | Fulweiler | July 24, 1928 |
| 2,652,435 | Hess et al. | Sept. 15, 1953 |
| 2,739,144 | Kelley | Mar. 20, 1956 |
| 2,739,992 | Lien et al. | Mar. 27, 1956 |
| 2,786,085 | Bloch | Mar. 19, 1957 |

FOREIGN PATENTS

| | | |
|---|---|---|
| 519,021 | Belgium | Apr. 30, 1953 |
| 1,065,587 | France | Jan. 13, 1954 |

OTHER REFERENCES

Pfeiffer: Ber., vol. 55, pages 413–29 (1952), page 419 only needed.